(12) United States Patent
Ryan, Jr.

(10) Patent No.: US 7,233,930 B1
(45) Date of Patent: Jun. 19, 2007

(54) POSTAGE METERING SYSTEM INCLUDING A PRINTER HAVING DUAL PRINT HEADS

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1055 days.

(21) Appl. No.: 09/722,177

(22) Filed: Nov. 27, 2000

(51) Int. Cl.
*G06F 17/00* (2006.01)

(52) U.S. Cl. .................................................. 705/408

(58) Field of Classification Search ............... 101/71; 283/71; 705/62, 400–410, 60, 63
See application file for complete search history.

(56) References Cited

U.S. PATENT DOCUMENTS

| | | | | |
|---|---|---|---|---|
| 3,889,592 A | * | 6/1975 | Lupkas et al. ............ | 101/93.47 |
| 4,864,618 A | * | 9/1989 | Wright et al. ............... | 380/51 |
| 4,900,904 A | * | 2/1990 | Wright et al. ............... | 235/381 |
| 5,065,000 A | * | 11/1991 | Pusic ........................... | 235/381 |
| 5,200,903 A | * | 4/1993 | Gilham ........................ | 705/408 |
| 5,325,773 A | | 7/1994 | Manduley .................... | 101/91 |
| 5,330,275 A | * | 7/1994 | Hasewinkle ................. | 400/82 |
| 5,508,933 A | * | 4/1996 | Abumehdi ................... | 705/408 |
| 5,635,694 A | * | 6/1997 | Tuhro .......................... | 235/375 |
| 5,684,949 A | * | 11/1997 | Naclerio ...................... | 713/200 |
| 5,745,887 A | * | 4/1998 | Gargiulo et al. ............ | 705/410 |
| 5,774,554 A | * | 6/1998 | Gilham ........................ | 380/51 |
| 5,822,738 A | * | 10/1998 | Shah et al. .................. | 705/410 |
| 5,949,467 A | | 9/1999 | Gunther et al. ............. | 347/214 |
| 5,991,409 A | * | 11/1999 | Windel et al. ............... | 705/62 |
| 6,064,993 A | | 5/2000 | Ryan, Jr. ..................... | 705/403 |
| 6,102,592 A | * | 8/2000 | Herbert ........................ | 400/106 |
| 6,173,273 B1 | * | 1/2001 | Herbert ........................ | 705/62 |
| 6,208,980 B1 | * | 3/2001 | Kara ............................. | 705/408 |
| 6,240,403 B1 | * | 5/2001 | Shah et al. .................. | 705/408 |
| 6,287,027 B1 | | 9/2001 | Komiya et al. | |

(Continued)

FOREIGN PATENT DOCUMENTS

EP    0825562 A2 *  2/1998

OTHER PUBLICATIONS

PRNewswire form St. Paul, Minn.: "Deluxe Reports Fourth Quarter, Year-End Results"; Jan. 24, 1995.*

Information-Based Indicia Program (IBIP) Performance Criteria for Information-Based Indicia and Security Architecture for Closed IBI Postage Metering Systems (PCIBI-C), Jan. 12, 1999, The United States Postal Service (USPS).

(Continued)

*Primary Examiner*—Igor N. Borissov
(74) *Attorney, Agent, or Firm*—Ronald Reichman; Angelo N. Chaclas (57) ABSTRACT

A postage metering system includes a computer, an authentication unit, a printer and a control system. The control system is in operative communication with the computer, the authentication unit and the printer. The authentication unit and the printer are both in operative communication with the computer. The printer includes an unsecure print head and a secure print head. The control system: (i) executes a transaction session between the computer and the authentication unit to generate postal data to be included in a postal indicium where the postal indicium includes non-authorization data; (ii) initiates a print request to print the postal indicium; and (iii) controls the unsecure print head to print the non-authorization data and the secure print head to print forensic evidence of the authenticity of the postal indicium.

16 Claims, 4 Drawing Sheets

U.S. PATENT DOCUMENTS

| | | |
|---|---|---|
| 6,532,026 B2 | 3/2003 | Takahashi et al. |
| 6,549,624 B1 * | 4/2003 | Sandru ........................ 380/51 |
| 6,709,018 B2 * | 3/2004 | Phillips ....................... 283/116 |
| 6,895,395 B1 * | 5/2005 | Blanluet et al. ............ 705/408 |
| 7,039,185 B2 | 5/2006 | Campagna et al. |
| 7,079,685 B1 | 7/2006 | Hirota et al. |

OTHER PUBLICATIONS

Information-Based Indicia Program (IBIP), Performance Criteria for Information-Based Indicia and Security Architecture for Open IBI Postage Evidencing Systems (PCIBI-O), Feb. 23, 2000, The United States Postal Service (USPS).

* cited by examiner

POSTAGE METERING SYSTEM INCLUDING A PRINTER HAVING DUAL PRINT HEADS

FIELD OF THE INVENTION

This invention relates to secure document printing systems. More particularly, this invention is directed to a postage metering system including a printer having dual print heads, one secure and one non-secure, for printing a verifiable postal indicium.

BACKGROUND OF THE INVENTION

One example of a document printing system is a postage metering system. As is well known, a postage meter is basically an accounting device that securely stores and keeps track of an amount of postage available for printing. Typically, the postage meter includes an ascending register that stores a running total of all postage dispensed by the meter, and a descending register, that holds the remaining amount of postage credited to the meter and that is reduced by the amount of postage dispensed during a transaction. The postage meter generally also includes a control sum register that provides a check upon the descending and ascending registers. The control sum register has a running account of the total amount of funds that have been added into the meter. The control sum register must always correspond with the summed readings of the ascending and descending registers. Thus, the control sum register is the total amount of postage ever put into the machine and it is alterable only when adding funds to the meter. In this manner, by inspecting the various registers and securing them from tampering, the dispensing of postal funds may be accurately recorded, tracked and accounted for.

Traditionally, the postage meter and the printer have been incorporated into a single secure housing. However, recent initiatives by the United States Postal Service (USPS) have enabled the decoupling of the postage meter and the printer. The Information-Based Indicia Program (IBIP) is a distributed trusted system established by the USPS to retrofit and augment existing postage meters using new technology known as information-based indicia. The IBIP relies on digital signature techniques to produce for each mail piece an indicium whose origin cannot be repudiated. Thus, in contrast to traditional postage metering systems employing mechanical printing technology and physical security, the IBIP supports new methods of securely applying postage to mail pieces. Generally, the IBIP requires printing a high density two-dimensional (2D) bar code on a mail piece. The 2D barcode encodes various information associated with the mail piece and is subsequently signed with a digital signature.

The USPS has published detailed specifications for the IBIP. Generally, the IBIP is directed to two types of postage metering systems. The first type is referred to as a closed system and is defined in the INFORMATION BASED INDICIA PROGRAM—PERFORMANCE CRITERIA FOR INFORMATION-BASED INDICIA AND SECURITY ARCHITECTURE FOR CLOSED IBI POSTAGE METERINGS SYSTEMS, dated Jan. 12, 1999, ("IBIP Closed System Specification"). The second type is referred to as an open system and is defined in the INFORMATION BASED INDICIA PROGRAM—PERFORMANCE CRITERIA FOR INFORMATION-BASED INDICIA AND SECURITY ARCHITECTURE FOR OPEN IBI POSTAGE EVIDENCING SYSTEMS, dated Feb. 23, 2000, ("IBIP Open System Specification"). Together, the IBIP Closed System Specification and the IBIP Open System Specification define the requirements for next generation postage metering systems.

Although the open and closed postage metering systems both work generally well, they suffer from certain drawbacks and disadvantages. The IBIP Open System Specification allows customers to use a generic "off the shelf" printer. As a result, these types of postage metering systems typically cost less because the customer is able to reuse its general office printer for printing postage. However, the IBIP Open System Specification requires that the recipient address (in the form of a delivery point zip code) be included in the postal indicium. This forces customers to input the destination address (either by hand or from a database) every time they want to print postage so that the recipient address and the corresponding postage indicium are generated and printed together as an integral unit. This is to ensure that address cleansing is performed and that there is a one to one correspondence between the recipient address and its associated postage indicium. As a result, the open system type of postage metering system must print this unit on the actual mail piece or label stock for later attachment to the mail piece.

On the other hand, the IBIP Closed System Specification do not require the delivery point zip code, but do require that the printer be a dedicated postage printing device. Thus, these types of postage metering systems allow for quicker transaction times for the customer (no need to input the recipient address, perform address hygiene or print the address) but cost more for the customer because of the investment necessary in a dedicated postage printer that has limited or no usefulness other than as a postage printing appliance.

Therefore, there is a need for a postage metering system that combines the operational efficiencies of a closed system meter with the cost advantages of an open system meter while satisfying the IBIP Specifications.

SUMMARY OF THE INVENTION

Accordingly, it is an object of the present invention to provide a postage metering system with closed system type meter functionality within an affordable cost structure.

In accomplishing this and other objects there is provided a postage metering system including a computer, an authentication unit, a printer and a control system. The control system is in operative communication with the computer, the authentication unit and the printer. The authentication unit and the printer are both in operative communication with the computer. The printer includes an unsecure print head and a secure print head. The control system: (i) executes a transaction session between the computer and the authentication unit to generate postal data to be included in a postal indicium where the postal indicium includes non-authorization data; (ii) initiates a print request to print the postal indicium; and (iii) controls the unsecure print head to print the non-authorization data and the secure print head to print.

Additionally, there is provided a general purpose secure document printer and methods of operating the postage metering system and the general purpose secure document printer, respectively, that are generally analogous to the summary provided above.

Therefore, it should now be apparent that the invention substantially achieves all the above objects and advantages. Additional objects and advantages of the invention will be set forth in the description which follows, and in part will be obvious from the description, or may be learned by practice of the invention. Moreover, the objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
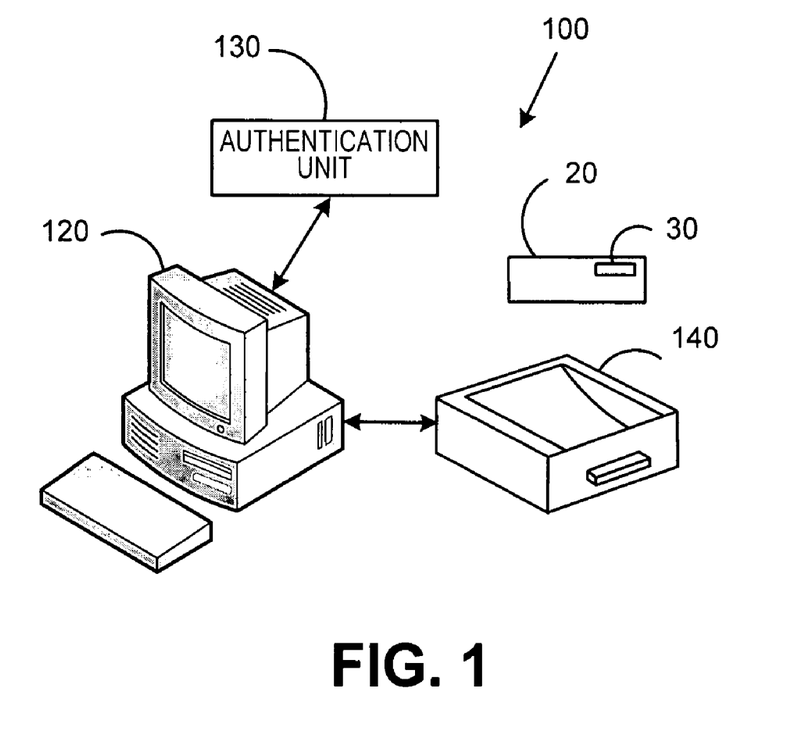
FIG. 1 is a schematic representation of a postage metering system including a personal computer, an authentication unit and a printer in accordance with the present invention.
Figure 2:
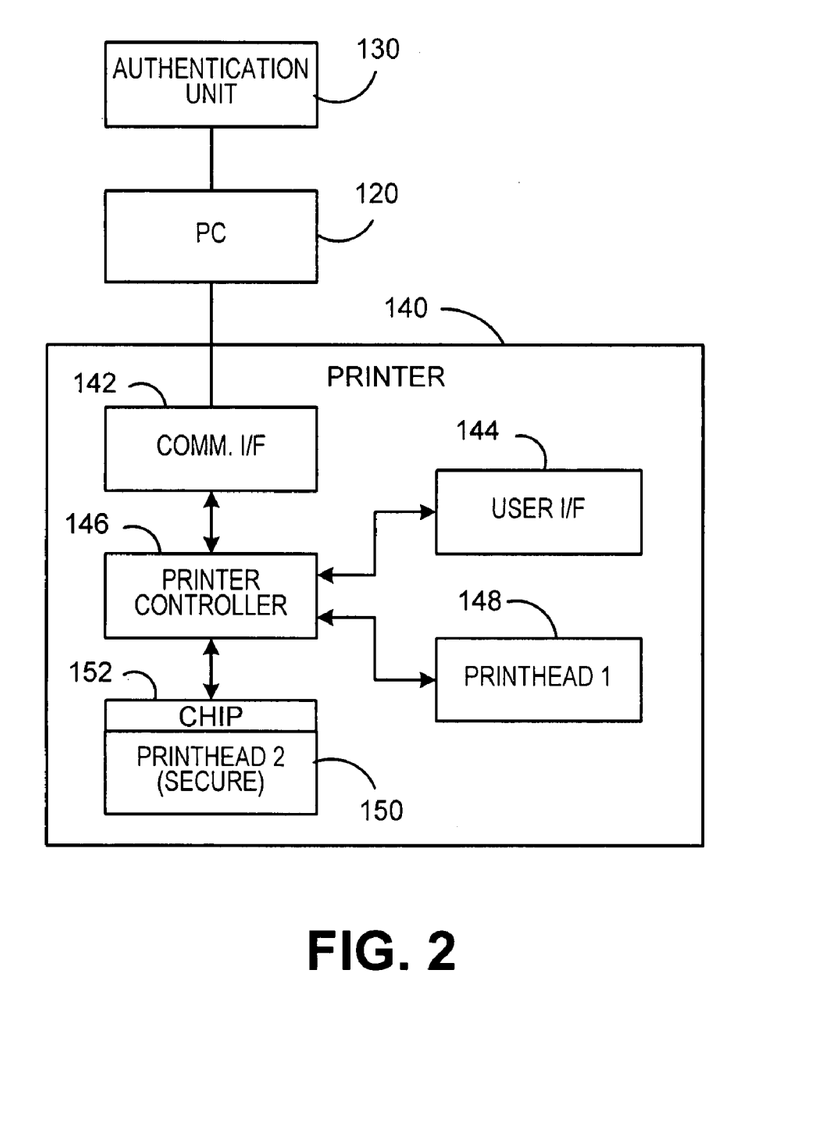
FIG. 2 is a schematic representation of the postage metering system of FIG. 1 showing the printer in greater detail in accordance with the present invention.

Referring to FIG. 1, a postage metering system 100 for printing a postal indicium 30 on a mail piece 20 (envelope, post card, label, or the like) is shown. The postage metering system 100 includes a personal computer 120, an authentication unit 130 and a printer 140. The authentication unit 130 may be a postal security device (PSD), other trusted accounting unit or a secure account file located on a remote server. Referring to FIG. 2 in view of FIG. 1, a more detailed schematic of the printer 140 is shown. Generally, the personal computer 120 is in operative communication with both the authentication unit 130 and the printer 140. The personal computer 120 may be of any conventional type and includes suitable computer processing, input/output devices and application programs. The printer 140 accepts print requests from a computer 120 using a standard print language (e.g., PCL, postscript) and processes print requests from the computer just as any standard printer. However, the printer 140 may also be used to print secure documents (e.g., postal indicia, legal documents). That is, the printer 140 prints both secure and unsecured documents, and the authentication unit 130 provides authentication services for enabling the printer 140 to print secure documents, such as the postal indicium 30. Although the authentication unit 130 is depicted as connected to the personal computer 120 and external to both the personal computer 120 and printer 140, it may be embedded in either the personal computer 120 or the printer 140. However, in the most preferred embodiment, the authentication unit 130 is located at a data center (remote server—not shown) that is accessible by the personal computer 120 over a suitable communication network, such as: a local area network, a wide area network, the Internet or the like.

The printer 140 includes a communication interface 142, a printer user interface 144, a printer controller 146, a first print head 148 and a second print head 150. The communication interface 142 manages the communications between the personal computer 120 and the printer controller 146. The printer user interface 144 is operatively connected to the printer controller 146 and may be of any conventional type, such as: LCD and keypad, or the like, for communicating message to and receiving instructions from the operator. The printer controller 146 may be of any conventional type, such as: a suitable microprocessor device having associated hardware and software applications, for controlling the operation of the printer 140. The first print head 148 is an "off the shelf" printing device (unsecure) and may employ any conventional printing technology, such as: laser, thermal transfer or ink jet printing. On the other hand, the second print head 150 is a secure printing device employing any conventional printing technology. This may be accomplished by integrating into the second print head 150 a secure chip or processor 152 for communicating with the authentication unit 130. While the first print head 148 is used for printing unsecure documents, the second print head 150 prints secure information and will only print after proper authentication with the authentication unit 130.

Proper authentication between the second print head 150 and the authentication unit 130 is necessary to provide for security of postal funds and to prevent fraud. Generally, this may be accomplished through any variety of techniques, such as supplying the second print head 150 and the authentication unit 130 with secret cryptographic keys which are necessary for mutual authentication to ensure that: (i) authentication unit 130 will only transmit authentication information to a second print head 150; and (ii) the second print head 150 will only print authentication information received from a valid authentication unit 130. Generally, a mutual authentication routine involves the encryption and decryption of secret messages transmitted between the second print head 150 and the authentication unit 130. An example of such a routine can be found in U.S. patent application Ser. No. 08/864,929, filed on May 29, 1997, and entitled SYNCHRONIZATION OF CRYPTOGRAPHIC KEYS BETWEEN TWO MODULES OF A DISTRIBUTED SYSTEM, incorporated herein by reference, now issued as U.S. Pat. No. 6,064,989. However, since the exact routine for mutual authentication is not necessary for an understanding of the present invention, no further description is necessary.

Figure 3:
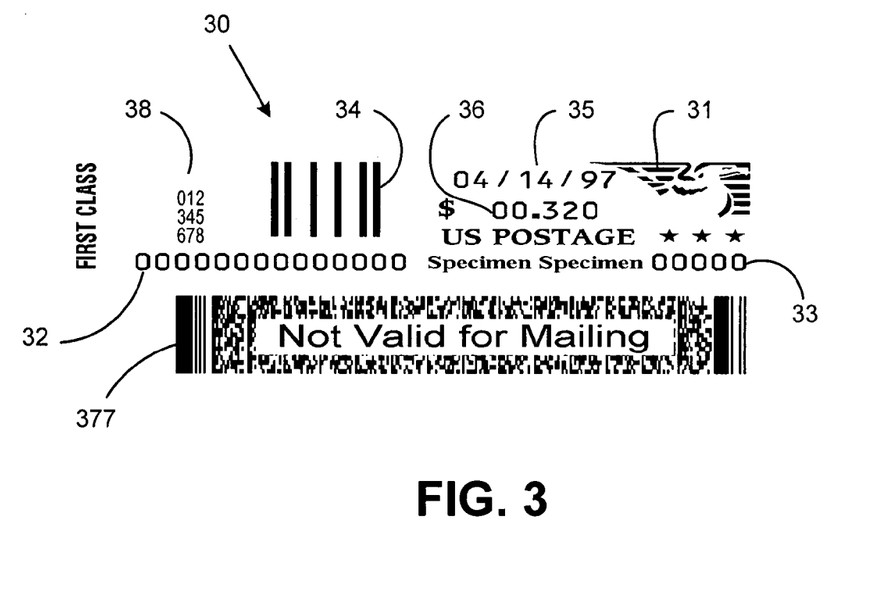
FIG. 3 is an example of a postal indicium printed by the postage printing system of the present invention.

Referring to FIG. 3 in view of FIGS. 1 and 2, an example of a postal indicium 30 is shown. Generally, the postal indicium 30 includes both fixed data that does not change from indicium to indicium and variable data that may change. The fixed and variable data may change depending upon postal authority requirements and the needs of the postage system manufacturer, but generally can be summarized as follows. The fixed data includes a graphic design 31 (an eagle with stars and US POSTAGE), a meter serial number 32 uniquely identifying the authentication unit 130 and/or the second print head 150, a licensing post office ID (Zip Code) 33 and an optional facer identification mark (FIM) 34 used during post office processing. The variable data includes a date 35 indicating when the postage was dispensed, a postal value 36 indicating an amount of postage, a bar code 37 containing both elements of both fixed and variable data and, in the most preferred embodiment, authentication information 38. The bar code 37 may be of any conventional format and is provided for the purpose of improving machine readability and increasing automated processing of the mail piece 20. Generally, the authentication information 38 is an encrypted message, such as a digital signature, digital token or other data, derived from the information contained with the postal indicium 30. The authentication information 38 may be in any format, such as:

alphanumeric string, bar code or the like. Most preferably, the authentication information 38 is incorporated into the bar code 37. Using the authentication information 38 and other data contained within the postal indicium 30, the postal authority can verify the authenticity of the postal indicium 30 using conventional techniques. Thus, the postal indicium 30 may also be classified as containing authentication information 38 and non-authentication information 31-37.

However, those skilled in the art will now recognize that since the purpose of the second print head 150 is to provide forensic evidence (not necessarily authentication information 38) of the authenticity (i.e., it is not a copy) of the postal indicium 30, other techniques may be employed. Thus, other evidence of authenticity besides the authentication information 38 may be used. In this embodiment, the first print head 148 would print the authentication information 38. The second print head 150 need not be a high-resolution print head but may employ hard to reproduce properties (e.g., special ink, dynamic image tells, non-standard dot pitch, non-uniform dot pitch) to provide such forensic evidence. Since the second print head 150 does not need to be high resolution (or even high quality) it can be added to the printer 140 relatively inexpensively. Although it would be possible to print the entire postal indicium 30 image with the second print head 150, this would place stringent print quality requirements on the image produce by the second print head 150, increasing its cost. Therefore, the first print head 148 is used to print the bulk of the desired image while the second print head 150 prints forensic evidence. Because of this division of labor, the second print head 150 need not produce a "high quality" image and can be relatively inexpensive.

The forensic evidence printed by the second print head 150 may be simple or complex depending upon application requirements. For example, the forensic evidence may be simply produced by using a specialized ink formulation (e.g., using fluorescent ink). Another alternative is to mount the second print head 150 in a manner (e.g., on a particular angle) which produces a hard to reproduce print density which can be detected by examination or by automated spectral analysis of the image. This alternative can also be extended by changing the orientation (even slightly) of the second print head 150 during printing. Orientation changes may be accomplished by moving the second print head 150 itself or by properties of the paper transport (e.g., varying the paper speed while keeping the printing speed of the second print head 150 constant). Yet another alternative is to introduce tells into the image printed by the second print head 150. One method of introducing tells into the image is by selectively omitting small portions of the image (individual print head dots) printed by the second print head 150 in a specific pattern. Another method is to have the first print head print 148 substantially all of the postal indicium 30 while the second print head 150 prints a pattern of seemingly random dots throughout the postal indicium 30. These examples of forensic evidence employing unique print patterns could be discerned for their significance by examination or by an automated image processing system. The unique print patterns may be unique to the second print head 150 and/or unique to each postal indicium 30, depending upon the degree of security desired.

Those skilled in the art will now recognize that the authentication unit 130 and the printer controller 146 may employ any suitable combination of computer processing, input/output devices and application programs. Furthermore, working cooperatively the computer 120, the authentication unit 130 the printer controller 146 and the second print head 150 serve as a control system for executing the functions described in greater detail below.

Figure 4:
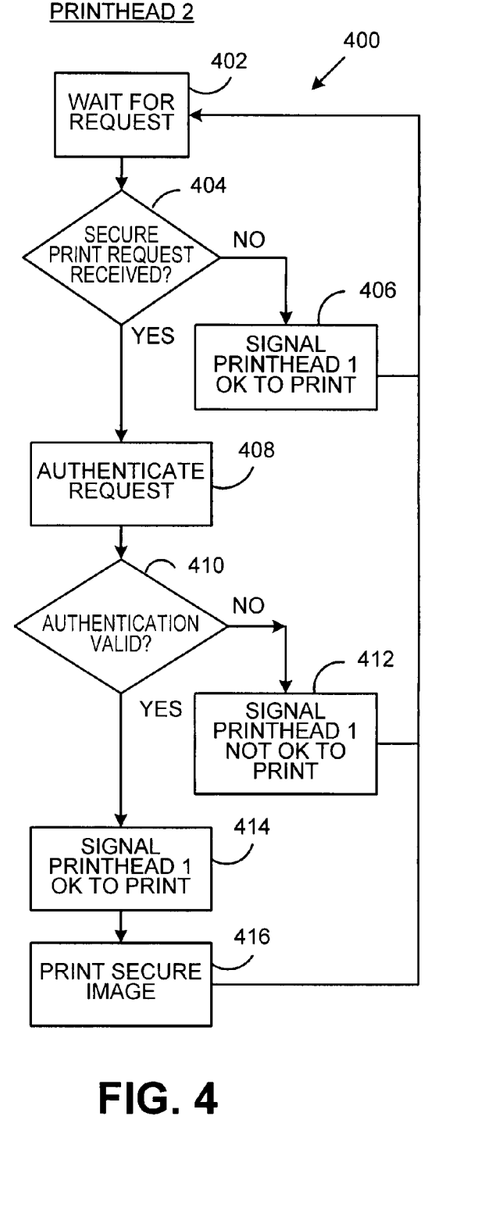
FIG. 4 and FIG. 5 are flow charts depicting the operation of a first print head and a second print head of the printer to produce the postal indicium in accordance with the present invention.
Figure 5:
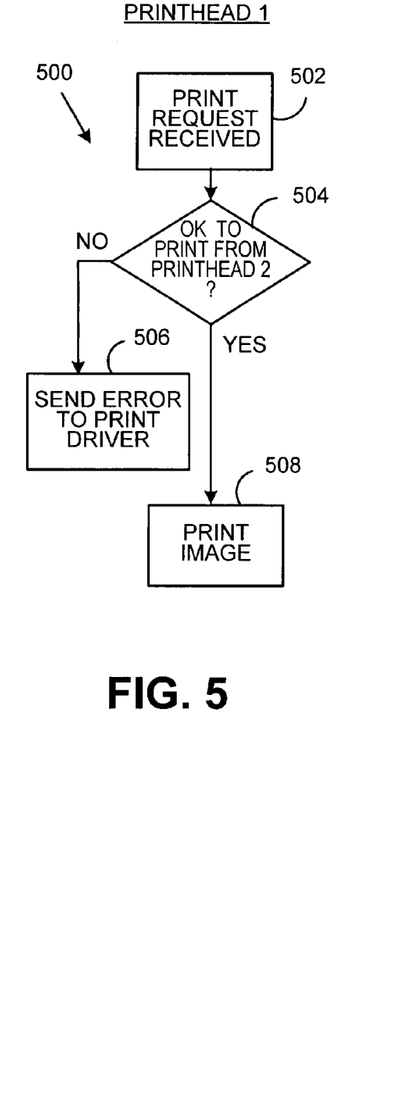

With the structure of the present invention described as above, the operational characteristics will now be described with respect to a typical printing cycle initiated by the operator. For the sake of clarity, it is assumed that the operator desires to print a postal indicium 30, as one example of a secured document. Additionally, the description provided below is of the most preferred embodiment where the second print head prints the authentication information 38. Referring primarily to FIGS. 4 and 5 while referencing the structure of FIGS. 1, 2 and 3, respective flow charts of the operation of the first print head 148 and the second print head 150 in accordance with the present invention are shown.

In the most preferred embodiment, all print instructions distributed to both the first print head 148 and the second print head 150 by the print controller 146 are dependent upon proper authorization from the second print head 150. Thus, every printing operation includes a reconciliation of print requests by the print controller 146 with the second print head 150 where the print requests are received from the computer 120. This reconciliation is described in greater detail below with respect to a reconciliation routine 400 and a first print head execution routine 500.

At 402, the reconciliation routine 400 idles or waits until the print controller 146 receives a print request. The print request is transmitted to the printer 140 via the computer 120. Those skilled in the art will recognize that any conventional transaction session between the computer 120 and the authentication unit 130 may be utilized to initiate the print request. That is, the computer 120 typically contacts the authentication unit 130, a postage amount is determined and postal data necessary to print a valid postal indicium 130 is generated by the authentication unit 130. One example of a more detailed description concerning this process is found in U.S. Pat. No. 6,064,993, filed on Dec. 18, 1997 and entitled CLOSED SYSTEM VIRTUAL POSTAGE METER, the disclosure of which is specifically incorporated herein by reference. Once a print request is received, at 404, a determination is made whether or not the print request is for a secure document. If the answer is no, then at 406 a signal is generated that indicates that the first print head 148 may print. Thus, when an unsecure print request is received, the reconciliation routine 400 terminates almost immediately and control passes to the first print head execution routine 500, to be discussed in greater detail below. On the other hand, if at 404 the answer is yes, then the print request is for a secure document and at 408 mutual authentication is initiated between the authentication unit 130 and the second print head 150. Next, at 410 a determination is made whether or not the mutual authentication was successful (the authentication unit 130 and the second print head 150 recognize each other as being valid devices). If the answer is no, then at 412 a signal is generated that indicates that the first print head 148 may not print. As a result, the first print head execution routine 500 does not execute properly and the routine 400 does not proceed past step 412. Thus, a failed mutual authentication in response to a secure print request preferably terminates the entire printing process. That is, the first print head 148 is not allowed to print the non-authentication information 31-37 and the second print head 150 is not allowed to print the authentication information 38. On the other hand, if at 410 the answer is yes, then at 414 a signal is generated that indicates that the first print head 148 may print. Next, at 416 the second print head 150 is allowed to print the authentication information 38 by receiving appropriate print control signals from the printer controller 146.

The first print head execution routine 500 will now be described. At 502, the routine 500 idles or waits until the print controller 146 receives a print request. Once a print request is received, at 504, a determination is made whether or not a signal indicating that the first print head 148 may print has been generated. If the answer is no, then at 506 an error signal is generated and the first print head 148 does not print. On the other hand, if at 504 the answer is yes, then at 508 the first print head 148 is allowed to print the non-authentication information 31-37.

Those skilled in the art will now recognize that the present invention substantially addresses the drawbacks and disadvantages associated with the prior art discussed above. For example, since the printer 140 is not dedicated to only printing secure documents (postal indicium 30), the customer gets the benefit of leveraging the investment in a generic printer. As another example, since the postage metering system 100 qualifies as a closed system type meter, the requirement for the operator to input the destination address is eliminated. This reduces transaction time for the operator. As yet another example, the second print head 150 can be relatively inexpensive since it does not have to produce high quality (dot density) images.

Additionally, various extensions to the most preferred embodiment may be employed. For example, the second print head 150 may use invisible ink to provide another layer of security to the evidence of authenticity. As another example, a first color ink may be used in the first print head 148 and a second color ink in the second print head 150. Among other things, this allows integrating the printing of the non-authentication information 31-37 with the evidence of authenticity to form a three dimensional bar code. As still another example, the ink in the second print head 150 may be applied to the mail piece 20 first as a "background" for the non-authentication information 31-37. In this way, the contrast between the "background" and the image printed by the first print head 146 is improved which leads to greater readability of the non-authentication information 31-37. As yet still another example, the manufacturing process of the second print head 150 (e.g., use wide tolerances) may be varied so that the population of second print heads 150 print differently in a unique way. Thus, a catalog of the "fingerprint" of each of the second print heads 150 may be developed to aid in forensic analysis.

Those skilled in the art will recognize that various modifications can be made without departing from the spirit of the present invention. For example, the exact configuration of the control system is subject to wide variety. The functionality may be distributed among the computer 120, the authentication unit 130, the printer controller 146 and the second print head 150 wherever it is convenient to do so. As another example, the description above has been provided with respect to a postage metering system 100 but is equally applicable to printing any secure document (text based letter, image, etc.). Thus, those skilled in the art will recognize that a first print head may print the "content" of the document while the second print head prints the forensic evidence that authenticates the document content.

Therefore, the inventive concept in its broader aspects is not limited to the specific details of the preferred embodiment but is defined by the appended claims and their equivalents.

What is claimed is:

1. A postage metering system, comprising:
a computer;
an authentication unit in operative communication with the computer;
a printer in operative communication with the computer, the printer including an unsecure print head and a secure print head the secure print head is mounted at a particular angle to produce a print density that is detected by spectral analysis; and
a control system in operative communication with the computer, the authentication unit and the printer, the control system for:
executing a transaction session between the computer and the authentication unit to generate postal data to be included in a postal indicium, the postal indicium including non-authorization data;
initiating a print request to print the postal indicium; and
controlling the unsecure print head to print the non-authorization data and the secure print head to print forensic evidence of the authenticity of the postal indicia, the forensic evidence being generated by the postage metering system.

2. The postage metering system of claim 1, wherein:
the postal indicium further includes authorization data; and
the forensic evidence of the authenticity of the postal indicia is the authorization data.

3. The postage metering system of claim 2, wherein:
the control system is further for:
preventing printing by the unsecure print head until an appropriate signal is generated by the secure print head.

4. The postage metering system of claim 3, wherein:
the control system is further for:
initiating a mutual authentication routine between the secure print head and the authentication unit; and
preventing printing by the secure print head if the mutual authentication is unsuccessful.

5. The postage metering system of claim 1, wherein:
the postal indicium further includes authorization data printed by the unsecure print head; and
the forensic evidence of the authenticity of the postal indicia is a unique print pattern.

6. The postage metering system of claim 5, wherein:
the unique print pattern is a tell that is embedded within the postal indicium.

7. The postage metering system of claim 6, wherein:
the control system is further for:
preventing printing by the unsecure print head until an appropriate signal is generated by the secure print head.

8. The postage metering system of claim 7, wherein:
the control system is further for:
initiating a mutual authentication routine between the secure print head and the authentication unit; and
preventing printing by the secure print head if the mutual authentication is unsuccessful.

9. A method of operating a postage metering system to print a postal indicium having non-authorization data, the method comprising the step(s) of:
executing a transaction session between a computer and an authentication unit to generate postal data to be included in the postal indicium;
transmitting a print request to a printer to print the postal indicium, the printer including an unsecure print head and a secure print head;
printing the non-authorization data with the unsecure print head; and printing forensic evidence of the authenticity of the postal indicia with the secure print head, the forensic evidence being generated by the postage metering system, wherein the secure print head is mounted at a particular angle to produce a print density that is detected by spectral analysis.

10. The method of claim 9, wherein:

the postal indicium further includes authorization data; and the forensic evidence of the authenticity of the postal indicia is the authorization data.

11. The method of claim 10, further comprising the step(s) of:

preventing printing by the unsecure print head until an appropriate signal is generated by the secure print head.

12. The method of claim 11, further comprising the step(s) of:

initiating a mutual authentication routine between the secure print head and the authentication unit; and preventing printing by the secure print head if the mutual authentication is unsuccessful.

13. The method of claim 9, wherein:

the postal indicium further includes authorization data printed by the unsecure print head; and the forensic evidence of the authenticity of the postal indicia is a unique print pattern.

14. The method of claim 13, wherein:

the unique print pattern is a tell that is embedded within the postal indicium.

15. The method of claim 14, further comprising the step(s) of:

preventing printing by the unsecure print head until an appropriate signal is generated by the secure print head.

16. The method of claim 15, further comprising the step(s) of:

initiating a mutual authentication routine between the secure print head and the authentication unit; and preventing printing by the secure print head if the mutual authentication is unsuccessful.

* * * * *